No. 750,116. Patented January 19, 1904.

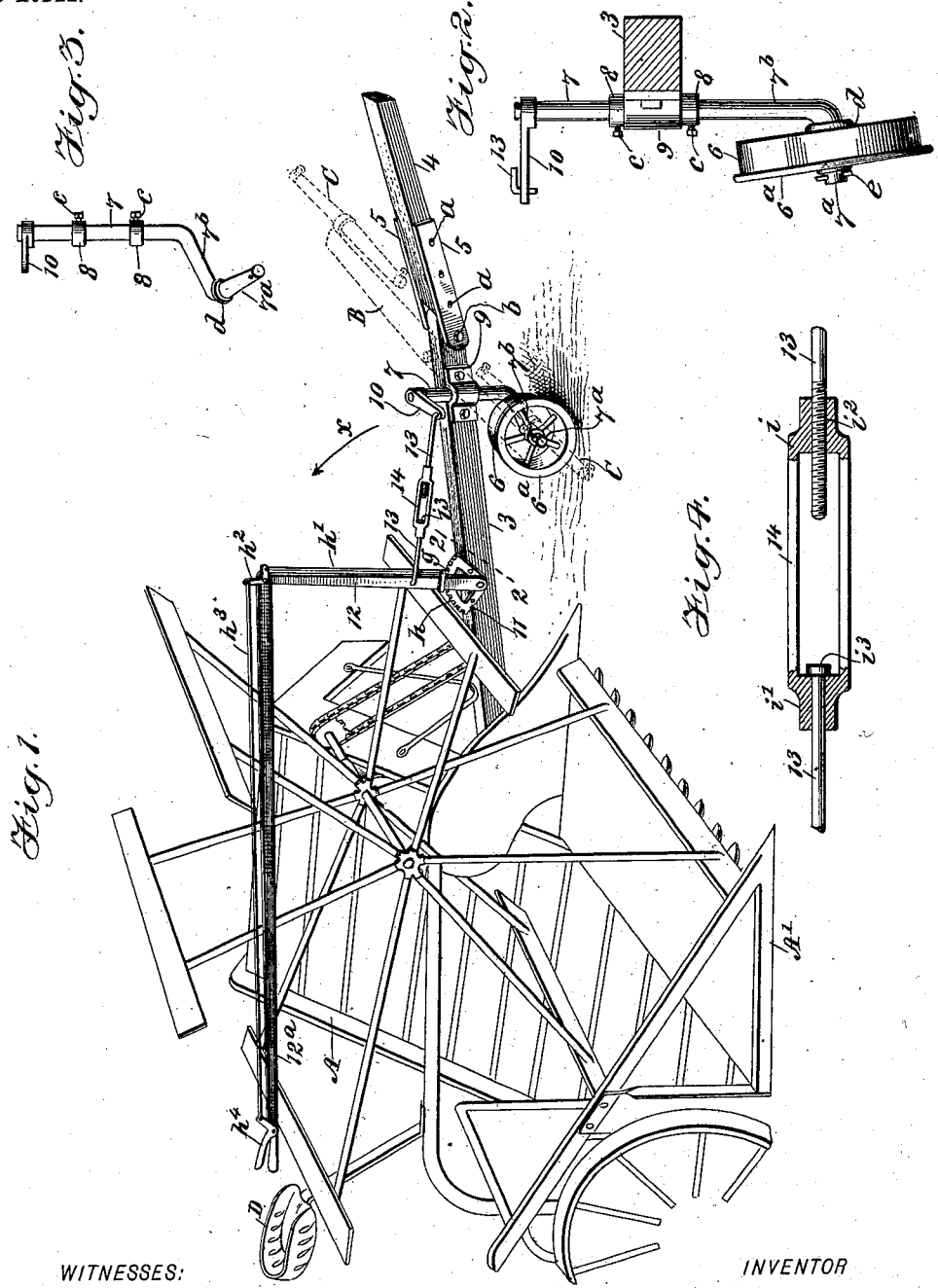

UNITED STATES PATENT OFFICE.

CARL F. ORTMAN, OF MARTINTON, ILLINOIS.

TONGUE-SUPPORT AND SIDE-DRAFT CHECK FOR GRAIN OR GRASS HARVESTERS.

SPECIFICATION forming part of Letters Patent No. 750,116, dated January 19, 1904.

Application filed October 17, 1902. Serial No. 127,628. (No model.)

*To all whom it may concern:*

Be it known that I, CARL F. ORTMAN, a citizen of the United States, and a resident of Martinton, in the county of Iroquois and State of Illinois, have invented a new and Improved Tongue-Support and Side-Draft Check for Grain or Grass Harvesters, of which the following is a full, clear, and exact description.

This invention relates to means for supporting the tongue or draft-pole of a grain harvester and binder or of a wide-cutting grass-mower, and has for its object to provide a device of the character indicated which embodies novel details of construction that adapt said attachment for convenient adjustment to compensate for turning movements had by the harvester while in operation and also reliably counteract side draft incidental to such machines.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a perspective view of the invention applied upon a grain-harvester. Fig. 2 is a transverse sectional view of the harvester-tongue and a front view of details mounted thereon. Fig. 3 is a perspective view of a bent standard employed and an axle-spindle thereon, and Fig. 4 is an enlarged plan view of a novel coupling on a connecting-rod employed.

In the drawings, which represent the construction and application of the invention, A indicates a grain harvester and binder of well-known construction.

The tongue of the harvester represented is curtailed in length and consists of two members 3 and 4. The rear member 3 of the tongue is held to project forwardly from the harvester-frame at one side of the grain-cutting mechanism A' and is of suitable length for efficient service.

At the front end of the tongue member 3 the rear end of the tongue member 4 is hinged thereon, the hinge-joint being preferably formed as shown in Fig. 1 and comprising two leaf-plates 5 held oppositely upon the respective sides of the tongue member 4 by transverse bolts $a$ and having the end portions projected from the member 4 to loosely embrace the forward end of the tongue member 3. A pivot-bolt $b$ is inserted transversely through alined perforations in the leaf-plates 5 and tongue member 3, near the end of the latter, which has clearance from the adjacent end of the tongue member 4, so that the latter may be freely rocked on the pivot-bolt from or toward the ground.

The doubletree B, carrying the swingletrees C, is pivoted upon the tongue member 3 near the hinge-joint bolt $b$, as indicated by dotted lines in Fig. 1.

An important feature of the invention (shown in Figs. 1 and 2) consists in the traction-wheel 6 and its supporting-standard 7, carried by the tongue member 3. The standard 7 is preferably formed of a metal bar round in cross-section and having a spindle $7^a$ projected angularly at the lower end of the same. The upper end of the standard 7 is straight, this straight part at its lower end merging into a laterally and downwardly inclined member $7^b$, which carries the spindle $7^a$, the latter projecting at a downward incline from the member $7^b$, as best shown in Fig. 2. Upon the upright portion of the standard 7 two collars 8 are adjustably mounted, each having a set-bolt $c$ screwed into a threaded perforation in the collar and bearing upon the standard to retain the collar at a desired point thereon.

The wheel 6 is radially flanged, as at $6^a$, upon one edge of its peripheral surface and has a central hub $d$ bored for the loose reception of the spindle $7^a$, and, as shown, the radial flange $6^a$ on the wheel 6 is disposed near the free end of the spindle, whereon the traction-wheel is loosely secured by a cross-pin $e$ or other means. The upright member of the standard 7 is held to rock upon one side of the tongue member 3 nearest the cutting mechanism A' of the harvester by a box 9, bolted fast upon the tongue member, as indicated in Fig. 1.

The collars 8 (shown in place on the standard in Figs. 2 and 3) are secured thereto one above the box 9 and the other below it and both in loose contact with true ends of the box, whereby the standard is mounted on the tongue and the wheel 6 is held projected at a suitable distance therefrom, the flange 6ª being outwardly and downwardly inclined and the peripheral face of the wheel correspondingly inclined upward toward the box 9, as shown in Fig. 2, which is a very advantageous feature of the improvement, as the inclination of the wheel-flange and face of the wheel adapts the same to positively bed in the soil and hold the tongue against side draft. A rock-arm 10 is secured by one end upon the upper end of the standard and projects therefrom, as shown in Figs. 1, 2, 3.

At a point near the standard 7 a sector 11 is erected upon the tongue member 3, and upon the lower portion of the sector 11 a lever 12 is pivoted at its lower end. The lever 12 is furnished with a detent-pawl $g$, that will interlock with any one of a series of spaced notches $h$, formed in the convex upper edge of the sector, and said pawl is connected with an upright rod $h'$, the upper end of which is pivoted upon one end of the bell-crank lever $h^2$, the latter being pivoted at its angle upon the upper end of the lever 12. From the vertical member of the bell-crank lever $h^2$ a tripping-rod $h^3$ extends rearwardly and at its rear end is pivoted upon one end of an angular tripping-handle $h^4$, held to rock on the rear portion of the pusher-bar 12ª, supported to slide on the part of the harvester-frame near the seat D. A connecting-rod 13 extends from the outer end of the rock-arm 10 and is pivoted at its rear end in the lever 12, and an adjustable coupling-nut 14 is introduced in the rod 13, and, as clearly shown in Fig. 4, said nut is in the form of a turnbuckle comprising two side bars held parallel with each other by integral end blocks $i$ $i'$.

An adjacent end portion of the bisected connecting-rod 13 is threaded and screwed into a threaded perforation in the block $i$, as shown at $i^2$ in Fig. 4, the unthreaded remaining end of the bisected connecting-rod 13 having a loose engagement within an unthreaded perforation in the end block $i'$ and is held from withdrawal therefrom by the head $i^3$, formed or secured on said end of the connecting-rod member.

It will be seen in Fig. 1 that in arranging the attachment for service on the harvester the rock-arm 10 is normally projected away from the tongue member 3 toward the wheel 6, and the bent member 7ᵇ on the standard 7 is similarly disposed at the same side of the tongue.

While the traction-wheel 6 is supported with its flange 6ª inclined away from the tongue member 3, the wheel is disposed with said flange substantially parallel to the tongue when the lever 12 is vertically adjusted, and so held by a locked engagement of the detent-pawl $g$ with a central notch in the sector 11. It will be seen in Fig. 1 that when the traction-wheel 6 is arranged parallel with the tongue member 3 and the lever 12 is upright then the head $i^3$ on the slidable end portion of the connecting-rod 13 will be drawn into contact with the end block $i'$, in which said portion of the connecting-rod is held to slide, and obviously a rearward movement of the lever 12 will now correspondingly rock the arm 10 rearward and turn the traction-wheel so that the rearward portion of the flange 6ª will approach the tongue member 3 and the forward portion of the same be rocked away from the tongue.

In service the lever 12 is vertically adjusted and held so by the engagement of the detent-pawl $g$ with the sector 11 when the harvester is drawn on a measurably straight line. If in operation of the machine it must be turned in the direction of the arrow $x$ in Fig. 1, then the person driving the draft-animals and occupying the seat D moves the lever 12 forwardly by pushing the bar 12ª toward the tongue 3, which will slide the head $i^3$ away from the end block $i'$ and afford end play for the forward portion of the connecting-rod 13.

If the wheel 6 is held parallel with the tongue by the means hereinbefore described, the lateral inclination and assured embedment of the flange 6ª in the soil will adapt the wheel 6 to counteract the side draft that grain and grass harvesters are subjected to and the wheel will afford support for the tongue, together with the front end of the harvester-frame, so as to adapt it to conform with the undulations of the ground over which the machine may be drawn.

The freedom given to the forward portion of the rod 13 by adjustment of the lever 12 forwardly permits the traction-wheel 6 to freely turn toward or from the tongue at the forward edge of the flange 6ª, more or less, as the radius of the turning curve requires, which will allow of turning the harvester without a side pull or a drag being produced by the wheel and its flange, so that the machine may be turned freely as occasion may require.

When it is necessary to make a short turning curve in a direction opposite from that indicated by the arrow $x$, this can be enforced by rocking the lever 12 rearwardly from a vertical position by pulling upon the bar 12ª, which will turn the traction-wheel inward or toward the tongue at the rear edge of the flange 6ª and hold the wheel thus adjusted, and thus adapt the bedded flange 6ª of the wheel 6 to positively control the turning movement of the harvester in the direction specified.

Having thus described my invention, I claim as new and desire to secure by Letters Patent—

1. The combination with a harvester-tongue, of an obtuse-angularly-bent standard, the straight portion of which is held to rock on said tongue, an inclined spindle on the bent portion of said standard, a flanged wheel rotatably held on the spindle, and means for controlling the rocking movement of the standard.

2. The combination with a harvester-tongue, of a standard held to rock upright on said tongue, the standard having an obtuse-angular bend below the tongue, a spindle extended at an obtuse angle from the bent member on the standard, a wheel held to rotate on the spindle and having a peripheral flange on the edge farthest from the tongue and that by the trend of the spindle is inclined away from the tongue, means for holding said flange substantially parallel with the tongue, and means for turning the standard so as to dispose the flange at an angle with the tongue.

3. The combination with a harvester-tongue, and a journal-box thereon, of an upright standard held to rock in the box and having an obtusely-bent member below the box, a laterally and downwardly bent spindle on the bent member of the standard, a wheel having a peripheral flange on the edge farthest away from the tongue and held to rotate on the downwardly-inclined spindle, a rock-arm on the upper end of the standard, and a device connected with the rock-arm and adapted to enable the rocking movement of the arm from a point on the harvester.

4. The combination with a rockably-supported standard on a harvester-tongue, said standard having an obtuse-angular-bent member extended from the lower portion thereof, and a downwardly-inclined spindle on the lower end of said member, of a rock-arm on the upper end of the standard, a sector carried on the rear portion of the tongue, a lever pivoted on the sector and having a pawl adapted to engage the sector, means for adjusting the pawl, a two-part connecting-rod extended from the lever to the rock-arm and pivoted thereon, and a coupling-nut on the rod connecting its members and adapted to lengthen or shorten it.

In testimony whereof I have signed my name to this specification in the presence of two subscribing witnesses.

CARL F. ORTMAN.

Witnesses:
  HERMAN LODE,
  R. E. WAMBA.